US006224800B1

(12) United States Patent
Rosthauser

(10) Patent No.: US 6,224,800 B1
(45) Date of Patent: May 1, 2001

(54) EXTENDED POLYMETHYLENE POLY (PHENYLISOCYANATE) RESIN BINDERS FOR THE PRODUCTION OF WOOD COMPOSITE PRODUCTS

(75) Inventor: James W. Rosthauser, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/213,606

(22) Filed: Dec. 17, 1998

(51) Int. Cl.$^7$ .................................................. B29C 59/00
(52) U.S. Cl. .................. 264/122; 264/331.19; 264/126; 524/13
(58) Field of Search ............................... 523/1.77; 524/9, 524/13, 15, 16, 31; 427/389.9, 285, 288, 392; 264/330, 331.17, 331.19, 109, 122, 125, 126

(56) References Cited

U.S. PATENT DOCUMENTS

| | | | |
|---|---|---|---|
| 3,666,593 | 5/1972 | Lee | 156/285 |
| 3,870,665 | 3/1975 | Diehr et al. | 260/17.2 |
| 4,100,328 | 7/1978 | Gallagher | 428/407 |
| 4,393,019 | 7/1983 | Geimer | 264/83 |
| 4,517,147 | 5/1985 | Taylor et al. | 264/83 |
| 4,546,039 | 10/1985 | Horacek et al. | 428/357 |
| 4,609,513 | 9/1986 | Israel | 264/122 |
| 4,617,223 | 10/1986 | Hiscock et al. | 428/211 |
| 4,684,489 | 8/1987 | Walter | 264/101 |
| 4,850,849 | 7/1989 | Hsu | 425/407 |
| 4,944,823 | 7/1990 | Stofko | 156/283 |
| 5,001,190 | 3/1991 | Carpenter et al. | 524/871 |
| 5,002,713 | 3/1991 | Palardy et al. | 264/109 |
| 5,008,359 | 4/1991 | Hunter | 527/103 |
| 5,128,407 | 7/1992 | Layton et al. | 524/839 |
| 5,140,086 | 8/1992 | Hunter et al. | 527/103 |
| 5,143,768 | 9/1992 | Wilderman et al. | 428/68 |
| 5,179,143 | 1/1993 | König et al. | 524/35 |
| 5,204,176 | 4/1993 | Seiss et al. | 428/304.4 |
| 5,332,458 | 7/1994 | Wallick | 156/210 |
| 5,641,819 | 6/1997 | Campbell | 524/14 |
| 5,674,568 | 10/1997 | Layton et al. | 427/389.9 |

FOREIGN PATENT DOCUMENTS

| | | |
|---|---|---|
| 2043331 | 12/1991 | (CA) . |
| 1387454 | 3/1975 | (GB) . |
| 3-21321 | 1/1991 | (JP) . |
| 88/03090 | 5/1988 | (WO) . |

OTHER PUBLICATIONS

James B. Wilson's paper entitled, "Isocyanate Adhesives as Binders for Composition Board" which was presented at the symposium "Wood Adhesives–Research, Applications and Needs"held in Madison, Wisconsin on Sep. 23–25, 1980.
Patent Abstracts of Japan, vol. 1997, No. 02, Feb. 28, 1997, & JP 08 269425 A (Dantani Plywood Co Ltd), Oct. 15, 1996 abstract.
Chemical Abstracts, vol. 98, No. 22, May 30, 1983, Columbus, Ohio, US; abstract No. 180662, "Isocyanate–Modified Polyurea Adhesives" XP002136179 abstract & JP 57 170973 A (Eidai Co. Ltd.) Oct. 21, 1982.

*Primary Examiner*—James J. Seidleck
*Assistant Examiner*—U. K. Rajguru
(74) *Attorney, Agent, or Firm*—Joseph C. Gil; N. Denise Brown

(57) ABSTRACT

This invention relates to a process for the production of wood composite materials. This process comprises combining wood particles with a mixture comprising a solid compound comprising urea and/or melamine, and a polymethylene poly(phenyl isocyanate), followed by molding or compressing the coated combination of wood particles.

15 Claims, No Drawings

EXTENDED POLYMETHYLENE POLY (PHENYLISOCYANATE) RESIN BINDERS FOR THE PRODUCTION OF WOOD COMPOSITE PRODUCTS

BACKGROUND OF THE INVENTION

This invention relates to a process for the production of composite wood products or materials. This process comprises combining wood particles with a mixture of (1) a compound selected from the group consisting of urea, melamine and mixtures thereof, and (2) a polymethylene poly(phenyl isocyanate), followed by molding or compressing the combination of wood particles and reactive mixture.

Composite materials such as oriented stand board, particle board and flake board are generally produced by blending or spraying lignocellulose materials such as wood flakes, wood fibers, wood particles, wood wafers, strips or strands, pieces of wood or other comminuted lignocellulose materials with a binder composition while the comminuted materials are blended by tumbling or agitating them in a blender or like apparatus. After blending sufficiently to form a uniform mixture, the materials are formed into a loose mat, which is compressed between heated platens or plates to set the binder and bond the flakes, strands, strips, pieces, etc. together in densified form. Conventional processes are generally carried out at temperatures of from about 150 to 225° C. in the presence of varying amounts of steam generated by liberation of entrained moisture from the wood or lignocellulose materials. These processes also generally require that the moisture content of the lignocellulose material be between about 2 and about 20% by weight, before it is blended with the binder.

Plywood production is accomplished by roll coating, knife coating, curtain coating, or spraying a binder composition onto veneer surfaces. A plurality of veneers are then laid-up to form sheets of required thickness. The mats or sheets are then placed in a heated press and compressed to effect consolidation and curing of the materials into a board.

Binder compositions which have been used in making such composite wood products include phenol formaldehyde resins, urea formaldehyde resins and isocyanates. See, for example, James B. Wilson's paper entitled, "Isocyanate Adhesives as Binders for Composition Board" which was presented at the symposium "Wood Adhesives—Research, Applications and Needs" held in Madison, Wis. on Sep. 23–25, 1980, in which the advantages and disadvantages of each of these different types of binders are discussed.

Isocyanate binders are commercially desirable because they have low water absorption, high adhesive and cohesive strength, flexibility in formulation, versatility with respect to cure temperature and rate, excellent structural properties, the ability to bond with lignocellulosic materials having high water contents, and no formaldehyde emissions. The disadvantages of isocyanates are difficulty in processing due to their high reactivity, adhesion to platens, lack of cold tack, high cost and the need for special storage. U.S. Pat. No. 3,870,665 and German Offenlegungs-schrift U.S. Pat. No. 2,109,686 disclose the use of polyisocyanates (and catalysts therefor) in the manufacture of plywood, fiberboard, compression molded articles, as well as various technical advantages when used as binders.

It is known to treat cellulosic materials with polymethylene poly(phenyl isocyanates) ("polymeric MDI") to improve the strength of the product. Typically, such treatment involves applying the isocyanate to the material and allowing the isocyanate to cure, either by application of heat and pressure (see, for example, U.S. Pat. Nos. 3,666,593, 5,008,359, 5,140,086, 5,143,768, and 5,204,176) or at room temperature (see, for example, U.S. Pat. Nos. 4,617,223 and 5,332,458). While it is possible to allow the polymeric MDI to cure under ambient conditions, residual isocyanate groups remain on the treated products for weeks or even months in some instances. It is also known to utilize toluylene diisocyanate for such purposes.

Isocyanate prepolymers are among the preferred isocyanate materials which have been used in binder compositions to solve various processing problems, particularly adhesion to press platens and high reactivity. U.S. Pat. No. 4,100,328, for example, discloses isocyanate-terminated prepolymers which improve product release from a mold. U.S. Pat. No. 4,609,513 also discloses a process in which an isocyanate-terminated prepolymer binder is used to improve product release. A binder composition in which a particular type of isocyanate prepolymer is used to improve adhesiveness at room temperature is disclosed in U.S. Pat. No. 5,179,143.

A major processing difficulty encountered with isocyanate binders is the rapid reaction of the isocyanate with water present in the lignocellulosic material and any water present in the binder composition itself. One method for minimizing this difficulty is to use only lignocellulosic materials having a low moisture content (i.e., a moisture content of from about 3 to about 8%). This low moisture content is generally achieved by drying the cellulosic raw material to reduce the moisture content. Such drying is, however, expensive and has a significant effect upon the economics of the process. Use of materials having low moisture contents is also disadvantageous because panels made from the dried composite material tend to absorb moisture and swell when used in humid environments.

Another approach to resolving the moisture and isocyanate reactivity problem is disclosed in U.S. Pat. No. 4,546,039. In this disclosed process, lignocellulose-containing raw materials having a moisture content of up to 20% are coated with a prepolymer based on a diphenylmethane diisocyanate mixture. This prepolymer has a free isocyanate group content of about 15 to about 33.6% by weight and a viscosity of from 120 to 1000 mPas at 25° C. This prepolymer is prepared by reacting (1) about 0.05 to about 0.5 hydroxyl equivalents of a polyol having a functionality of from 2 to 8 and a molecular weight of from about 62 to about 2000 with (2) one equivalent of a polyisocyanate mixture containing (a) from 0 to about 50% by weight of polyphenyl polymethylene polyisocyanate and (b) about 50 to about 100% by weight isomer mixture of diphenylmethane diisocyanate containing 10 to 75% by weight of 2,4'-isomer and 25 to 90% by weight of 4,4'-isomer.

U.S. Pat. No. 5,002,713 discloses a method for compression molding articles from lignocellulosic materials having moisture contents of at least 15%, generally from 15 to 40%. In this disclosed method, a catalyst is applied to the lignocellulosic material. A water resistant binder is then applied to the lignocellulose with catalyst and the coated, materials are then compression shaped at a temperature of less than 400° F. to form the desired composite article. The catalyst is a tertiary amine, an organometallic catalyst or a mixture thereof. The binder may be a hydrophobic isocyanate such as any of the polymeric diphenylmethane diisocyanates, m- and p-phenylene diisocyanates, chlorophenylene diisocyanates, toluene diisocyanates, toluene triisocyanates, triphenylmethane triisocyanates, diphenylether-2,4,4'-triisocyanate and polyphenyl polyisocyanates. The catalyst is included to ensure that the isocyanate/water reaction is not slowed to such an extent that the pressing time necessary to produce the molded product is significantly increased.

Pressing of wafer board, oriented strand board, and parallel strand lumber using steam injection and a conventional binder such as a urea-formaldehyde resin or a polymeric diphenylmethane diisocyanate (MDI) is known. Examples of such known pressing processes are disclosed in U.S. Pat. Nos. 4,684,489; 4,393,019; 4,850,849; and 4,517,147. These processes yield a product having satisfactory physical properties if the binder is completely cured.

The completeness of binder cure may, of course, be determined by destructive testing of samples which have been permitted to cure for varying amounts of time under the process conditions. The cure time to be used during the production process is determined on the basis of the sample which had completely cured in the least amount of time. The disadvantages of this method are readily apparent. Valuable product is destroyed in the testing. Further, any variation in wood composition, extent of binder dispersion on the wood particles, etc. or processing conditions which would affect the rate of binder cure are not taken into consideration in the above-described method.

U.S. Pat. No. 5,641,819 describes a process for the preparation of a composition board wherein the fines separated from the majority of the larger wood particles are coated with binder and the mixture is used as a binder for the larger wood particles to form the composition board. Here, the fines serve as a carrier for the urea formaldehyde resin binder.

U.S. Pat. No. 4,944,823 describes a composition for bonding solid lignocellulosic materials. Suitable binder formulations are based on the reactive mixture of an isocyanate and a carbohydrate material. These are both effective and inexpensive, and eliminate health hazards associated with the use of formaldehyde. Carbohydrate materials include, for example, sugars and starches, in the presence or absence of other active materials. These carbohydrates are mixed with a liquid diisocyanate and applied to the wood, which is then pressed to form a composite product.

Binding compositions comprising urea extended polyisocyanates derived from a combination of a polyisocyanate and urea which is in solution with water, and the process for preparing the binding compositions is disclosed in U.S. Pat. No. 5,128,407. This reference also describes a process for preparing a composite material from comminuted particles or veneers of a lignocellulose material comprising coating the particles or veneers with these binding compositions. Using the process of this invention, one adds a significant amount of water to the wood particles, which must subsequently be removed during the molding operation with the undesirable result of increasing press cycle times.

The large scale industrial manufacture of composite materials which are bonded exclusively with polyisocyanates have previously been limited. The use of some of the polyisocyanates, particularly the better performing isocyanates, such as polymethylene diisocyanate has been limited by their cost. Because of the cost constraints, the level of use of these expensive isocyanates is kept low for a given material. One approach to the use of levels of these isocyanates has involved chain extending the isocyanate with inexpensive extenders.

It has been known that organic polyisocyanate resins have excellent adhesion properties and workability as the adhesive for thermo-compression molded articles such as particle boards and medium-quality fiber boards produced from a lignocellulose type material such as wood chips, wood fibers, and the articles exhibit excellent physical properties. However, the excellent adhesiveness of the organic polyisocyanate resins causes disadvantage that the compression molded article adheres firmly to the contacting metal surface of the heating plate in a continuous or batch thermo-compression process.

To solve the disadvantages of the undesired adhesion to the heating plate, it is required that a releasing agent is preliminarily sprayed onto the heating plate surface to form a releasing layer. Japanese Patent Publication No. 3-21321 discloses a method different from the external releasing agent spray, in which a mixture of an organic polyisocyanate and a mineral wax is sprayed onto the lignocellulose type material prior to thermo-compression molding. Japanese Patent laid open application No. 4-232004 discloses a method of thermo-compression molding of a lignocellulose type material by addition of a neutral ortho-phosphate ester as a compatibilizing agent, the U.S. Pat. No. 5,001,190 and PCT application WO 88/03090 disclose a process for filling a space within a structure with a polyurethane composite in the presence of water. Suitable polyurethane composites comprise (a) adding a coarse aggregate to the space in the structure to be filled, (b) adding a polyurethane binder to the aggregate, wherein the binder comprises (I) a phenolic resin component comprising a resole phenolic resin and a hydrophobic solvent system, and (ii) a polyisocyanate component comprising an aromatic polyisocyanate and a hydrophobic solvent, and (iii) a urethane promoting catalyst.

Isocyanates are known to be suitable components for treating cellulosic fiber and wood products. Some processes for this treatment are described in, for example, U.S. Pat. Nos. 5,179,143 and 5,674,568. The binders of U.S. Pat. No. 5,179,143 comprise polyisocyanates, compounds containing at least two isocyanate reactive hydrogen atoms and alkylene carbonates. The binders for modified cellulosic products of U.S. Pat. No. 5,674,568 comprise a polymethylene poly(phenylisocyanate), water, and an organic compound having a hydroxy functionality of from 2 to 8 and a molecular weight of about 60 to 8000 and being selected from the group consisting of ester group-free polyhydric alcohols, polyether polyols and mixtures thereof.

It is the purpose of this invention to provide an improved process for the production of composite wood products using a reactive mixture of polyisocyanate and solid deactivated amine containing co-reactant as a binder. This improved binder has the advantages that it uses less of the relatively expensive polyisocyanate to provide properties comparable to traditional MDI binders. The reactive amine containing extenders act as carriers for the liquid binder. These extenders do not contain additional water which can increase press cycle times. The tendency of the resin to adhere to the platens may also be reduced.

SUMMARY OF THE INVENTION

This invention relates to a process for the production of wood composite materials comprising a) combining wood particles with 1 to 25% by weight, based on the total weight of the wood composite, of a mixture, followed by b) molding or compressing the coated combination. Suitable mixtures for coating the wood particles consist essentially of:

(1) a solid, dry compound selected from the group consisting of urea, melamine, and mixtures thereof, and (2) a polymethylene poly(phenyl isocyanate) having a functionality of about 2.1 to about 3.5, an NCO group content of from about 30 to 33%, and a monomer content of from about 30 to about 90% by weight, wherein the content of the monomer comprise up to about 5% by weight of the 2,2'-isomer, from about 1 to about 20% by weight of the 2,4'-isomer and from about 25% to about 65% by weight of the 4,4'-isomer, based on the entire weight of the polyisocyanate;
wherein the weight ratio of component a)(1) to component a)(2) is from 10:1 to 2:1, preferably 3:1 to 7:1.

In another embodiment of the present invention, the process comprises a) combining wood particles with (1) a solid, dry compound selected from the group consisting of urea, melamine, and mixtures thereof, b) coating the combination from a) with (2) a polymethylene poly(phenyl isocyanate) having a functionality of about 2.1 to about 3.5, an NCO group content of from about 30 to 33%, and a monomer content of from about 30 to about 90% by weight, wherein the content of the monomer comprise up to about 5% by weight of the 2,2'-isomer, from about 1 to about 20% by weight of the 2,4'-isomer and from about 25% to about 65% by weight of the 4,4'-isomer, based on the entire weight of the polyisocyanate;and c) molding or compressing the coated combination formed in b).

Another alternate embodiment of the present invention, the process comprises a) combining wood particles with (2) a polymethylene poly(phenyl isocyanate) having a functionality of about 2.1 to about 3.5, an NCO group content of from about 30 to 33%, and a monomer content of from about 30 to about 90% by weight, wherein the content of the monomer comprise up to about 5% by weight of the 2,2'-isomer, from about 1 to about 20% by weight of the 2,4'-isomer and from about 25% to about 65% by weight of the 4,4'-isomer, based on the entire weight of the polyisocyanate; b) coating the combination from a) with (1) a solid, dry compound selected from the group consisting of urea, melamine and mixtures thereof; and c) molding or compressing the coated combination formed in b).

In either of these alternate embodiments where one component is applied first to the wood particles, followed by the second component, the weight ratio of component a)(1) to component b)(2) is from 10:1 to 2:1, preferably from 7:1 to 3:1. The amount of components a)(1) and b)(2) applied to the wood particles is such that there is from 1 to 25% by weight (preferably 2 to 10% by weight, more preferably 3 to 8% by weight) of these two components present, based on the total weight of the wood composite.

DETAILED DESCRIPTION OF THE INVENTION

Polymeric MDI as used herein, refers to the three-ring and/or higher ring products derived by the phosgenation of aniline-formaldehyde condensation products.

Suitable polyisocyanates to be used as component (2) of the binder compositions in the present invention include those polymethylene poly(phenylisocyanate) blends having a functionality of about 2.1 to about 3.5 and an NCO group content of about 30 to 33% by weight. These typically have a monomer content of from about 30 to 90% by weight, with the balance being polymeric MDI, i.e. higher homologues of the MDI series. The content of the monomeric MDI comprise up to about 5% by weight of the 2,2'-isomer, from about 1 to 20% by weight of the 2,4'-isomer and from about 25 to 65% by weight of the 4,4'-isomer, based on the entire weight of the polyisocyanate.

A preferred polymethylene poly(phenylisocyanate) blend has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the blend. This polyisocyanate blend comprises from about 20 to about 45% by weight of polymeric MDI.

Most preferred polyisocyanates include, for example, polymethylene poly(phenylisocyanate) blends having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the blend. This isocyanate blend comprises from about 50 to about 60% by weight of polymeric MDI.

Suitable polyisocyanates to be used as component (2) of the compositions in the present invention include those polymethylene poly(phenylisocyanate) compositions and blends having a NCO group content of about 25% to 33% by weight, and having a viscosity of less than about 2,000 cps at 25° C. The polyisocyanates of the present invention have a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the composition or blend. The polymeric MDI content of these isocyanates varies from about 10 to about 70% by weight, preferably from about 30% to about 60% by weight.

Suitable polyisocyanates for component (2) of the present invention also include, for example, mixtures of polyisocyanate blends as described above with adducts of MDI including, for example, allophanates of MDI as described in, for example, U.S. Pat. Nos. 5,319,053, 5,319,054 and 5,440, 003, the disclosures of which are herein incorporated by reference, and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

When used in the ranges of the present invention, the mixtures of solid amines and polyisocyanate have the consistency of a moist powder or that of brown sugar. The powdered binder formulations are applied to wood particles in the manufacture of particle board, wafer board, fiber board, etc., by intermixing a stream of wood particles with a stream of the powdered binder formulation at the desired ratio and using mechanical agitation which is in common usage in the manufacture of composite products such as particle board. When using powdered binders to make particle board or the like, the wood may have a wide range of moisture content, i.e., from about 0.5 to about 10% by weight, based on the total weight of the wood particles. However, it is advantageous if the moisture content of the wood particles is relatively low, i.e., on the order of about 1 to 6%, and after initial pressing and prior to final compacting in a hot press, the pre-formed particle board is sprayed with water to increase its moisture content to 10 to 11%.

Alternatively, although less preferred, binders can be added separately and subsequently blended together with the wood particles. This is less preferred because, at least in some cases, the two co-reactants are not intimately mixed in the proper ratios. As soon as the binder according to the invention comes into contact with wood, it starts reacting with the water contained in the wood.

The binder and resultant products are free of formaldehyde and the composite is produced at a cost competitive to the cost of making wood products using urea-formaldehyde resin which has the serious problem of formaldehyde emission. The binder formulation can also be applied to wood at higher moisture content which saves energy by reducing the degree of drying normally required prior to pressing.

Suitable solid, dry compounds to be used as component (1) of the present invention include urea, melamine, and mixtures thereof. The dry, solid urea, melamine and mixtures thereof contain, for the purposes of this invention, less than 10% by weight of water, and are preferably in the absence of water. Alternatively, similar compounds including, but not limited to guanidine or dicyanodiamide can be used, but they are preferably added as mixtures with urea and/or melamine due to their disadvantageous tendency to release ammonia.

As used herein, the term "dry" means that there is less than 10% by weight of entrained water in the solid.

Known catalysts for accelerating the isocyanate addition reaction may in principle be used in forming these binder compositions. It is preferred that catalysts are not present in the reaction mixture of the present invention. Suitable catalysts for this purpose include tin compounds such as dibutyl tin dilaurate or tin(II) octoate. Other catalysts are described in "Kunstoff Handbuch", Volume VII, published by Becker and Braun, Carl Hanser Verlag, Munich, 1983 on pages 92–98. The catalysts are used, if at all, in a quantity of about 0.001 to 10% by weight, preferably about 0.002 to 0.1 % by weight, based on the total quantity of reactants.

Other optional additives and/or auxiliary agents which may be included in the binding compositions of the present invention include, for example, wax and wax emulsions for reduced water absorption, preservatives, surface active additives, e.g. emulsifiers and stabilizers, mold release agents such as, for example, zinc stearate, etc.

In the embodiment of the invention wherein the melamine or urea content is low, a stabilizer can be employed in an amount sufficient to provide a binding composition having a working consistency. By the term "working consistency" is meant the composition is in a range such that it is a free flowing powder through that of brown sugar.

As indicated above, the percentages of ingredients in the wood binder compositions according to the present invention can vary widely according to needs and conditions of a particular application. In general, however, quantities in the following ranges have been found suitable, bearing in mind that the other active materials may comprise one or more of the catalysts, stabilizing agents and release agents.

A preferred formulation for the composite products, such as particle board, comprises a blend of melamine and/or urea, together with isocyanate (PMDI), with or without stabilizing agent, catalyst or release agent. The formulation for a particular product will depend upon wood species, requirements of physical properties of the resultant product, and pressing conditions, For example, a formulation range for Douglas fir commercial furnish requirements for interior particle board pressed at a press platten temperature of 350° F. for 4.4 minutes press time, to give a high quality commercial product is as follows:

| Components | Preferred range |
| --- | --- |
| Melamine or Urea | 50–70% |
| PMDI | 5–35% |
| Stabilizer | 20–35% |
| Wax | 3–10% |

This binder formulation may be used in an amount of 1 to 25% by weight, expressed as a percentage of the total wood weight, or about 0.25 to 8.0% of PMDI based on the wood weight. Preferably, the quantity of binder formulation based on the weight of the wood is about 2 to 10%, depending on the configuration of the particulate wood and the requirements of the products. Also, if a small amount of isocyanate is used in the binder formulation (e.g., about 10 to 20% based on the total binder formulation, providing a relatively dry powder), then relatively greater proportions of binder formulation will be used (e.g., 8 to 10% binder formulation, or 1 to 2% isocyanate based on the wood weight). On the other hand, when relatively small quantities of binder formulation are used (e.g., 2 to 6%) then the quantity of isocyanate in the powdery binder should be somewhat greater (e.g., 25 to 35% of binder formulation) to provide sufficient bonding, this provides a minimum percentage of isocyanate based on the quantity of wood of about 0.5 to 2%. In general, using a preferred powdery binder formulation, the maximum amount of isocyanate present will be about 20% based on the binder, or 2% based on the wood when 10% binder is used.

Although much less preferred, it is also possible to make liquid binder formulations according to the present invention using small quantities of inert, polar, non-aqueous solvent such as, for example, methylene chloride, or plasticizers such as, for example, butyl benzylphthalate or dioctyl phthalate, or solutions of novolak resins in inert, polar, non-aqueous solvents can also be used. Liquid binder formulations can have limited potlife. Care must also be exercised in minimizing the water content of these dissolved deactivated amines because of the undesirable reaction between the isocyanate and the water prior to the wood bonding operation.

Liquid binder formulations according to the present invention can also be made by first mixing a relatively large quantity of dry deactivated amine with a relatively small quantity of isocyanate, letting the mixture react to the point where free isocyanate is no longer present and then adding inert solvent or plasticizer to form a viscous mass. Thus, such a viscous mass can be obtained by first blending isocyanate with urea or melamine in the ratio of 10 to 50% by weight isocyanate and 50 to 90% by weight of powdered amine, then letting the mixture react for 5 to 60 minutes, and finally adding 30 to 70%, based on the weight of the mixture, of inert solvent or plasticizer to obtain a viscous mass suitable for roller spreading on veneers in plywood manufacture. Viscosity can be controlled by adjusting the ratio of components in the mixture.

Binder formulations according to the present invention are made by blending together the various components in the proper sequence as noted above. When producing the preferred powdery binders, such blending preferably involves vigorous agitation for several minutes, such as in a suitable mill, in order to insure thorough blending of the isocyanate with the other components. It is preferable to blend together first the isocyanate with the stabilizing agent, catalyst (if present) and release agent (if one or more of these latter components are used) and then to add the melamine and/or urea. Of course, the blending should be carried out for a time sufficient to produce a homogeneous blend, and under vigorous blending conditions, this will usually occur after several minutes of vigorous agitation.

As set forth herein, the polyisocyanate is blended with a solid urea, a solid melamine, and/or a mixture thereof to produce a stable mixture of the invention. The consistency of the mixture can be from a dry, free-flowing powder to that of brown sugar.

In the practice of the claimed invention, the amount of the binding composition would depend on the kind of materials that are being formed into a composite, the moisture content and the like. Typically, the binding composition can be employed in an amount of 1 to 25% by weight, preferably 2 to 10% by weight and most preferably 3 to 8% by weight, based on the total weight of the wood composite.

The process of preparing the composited material from comminuted particles of fiber, wood or cellulosic materials comprises coating the particles with the binding composition of the claimed invention containing a urea and/or melamine extended polyisocyanate.

The reconstituted composite panels are fabricated by mixing the comminuted materials with a binder composition while the materials are tumbled or agitated in a blender or like mixing apparatus. Generally, the binder system is added in an amount equal to 1 to 25% by weight, based on the total weight of the wood composite. If desired, other material such as fire retardances, preservatives, waxes, biocides and the like may also be added to the materials during the blending stage.

Specific examples of suitable raw materials containing lignocellulose which may be bound with the binder according to the invention include, for example, wood, bark, cork, bagasse, straw, flax, bamboo, alfalfa, rice husks, sisal fibers, coconut fibers, etc. However, pressed articles may also be produced according to the invention from other organic (i.e. plastic scraps of various types) and/or inorganic raw materials (e.g. mica or silicate beads). In this case, the materials may be present in the form of granules, shavings, fibers, beads or dust and may have a moisture content of, for example, from 1 to 20% by weight, based on the total weight of the raw materials containing lignocellulose.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The examples of this invention used the following components:

Isocyanate A: a polymeric MDI (PMDI) blend with a viscosity of 200 mPA.s, and an isocyanate content of 31.5%; commercially available from Bayer Corporation.

Melamine: This substance was purchased from Aldrich Chemical Company, ground using a mortar and pestle, and sieved through a #45 US-mesh sieve.

Urea: This substance was purchased from Aldrich Chemical Company, ground using a mortar and pestle, and sieved through a #45 US-mesh sieve.

Sebacic Acid: This substance was purchased from Aldrich Chemical Company, ground using a mortar and pestle, and sieved through a #45 US-mesh sieve. In all cases (with the exception of example 6) for the purpose of this invention, sebacic acid is added at 0.5 weight percent based on the total weight (wood+binder) of every individual formulation.

Procedure for Preparation of Isocyanate A/ Melamine Binder

Two parts of Isocyanate A were combined with one part Sebacic acid in a 32-oz. jar and mixed well. One and one half parts Isocyanate A/Sebacic acid were added to seven parts Melamine. Burundum cylinders were added to the 32-oz. jar, which was then rolled in a roller table for 1 to 1.5 hours. The container was periodically opened, and material clinging to the container walls was scraped off. The binder mix was then sieved through a #45 US-mesh sieve and placed in a catch pan. The catch pan containing the binder was placed in a dessicator for 3 to 4 hours.

Procedure for Preparation of Isocyanate A/Urea Binder

Two parts of Isocyanate A (with the exception of example 6, where four parts were added) were combined with one part Sebacic acid in a 32-oz. jar and mixed well. The Isocyanate A/Sebacic acid was added to the Urea (in ranges described in the table below), and burundum cylinders were added to the 32-oz. jar. The jar was then rolled on a roller table for 1 to 1.5 hours. The container was periodically opened, and material clinging to the container walls was scraped off. The binder mix was then sieved through a #45 US- mesh sieve and placed in a catch pan. The catch pan containing the binder was placed in dessicator for 3 to 4 hours.

Procedure for Preparation of Boards (Melamine or Urea binders)

Particleboard furnish was placed in a stainless steel bowl (for use in a KitchenAid KSM90 mixer). The binder mixture, now semi-dried, was added in 5–10 g increments, in the amounts listed in the table. The quantity of wood furnish used in each example was sufficient to provide a total of 100 parts by weight of wood furnish and binder mixture. Thus, Examples 1–6 used 92 parts by weight of wood furnish, Example 7 used 96 parts by weight of wood furnish and Example 8 used 95 parts by weight of wood furnish.

The furnish was mixed by hand initially to promote uniform dispersion of the binder/furnish mixture. The stainless bowl was transferred to the KitchenAid mixer and mixed at lowest speed for 5 minutes. The resin-coated furnish was then placed in an eight inch by eight inch form and pre-pressed by hand. The form was then placed in a Carver Press (Model M), and pressed to about ½ inch thickness using 625 psi pressure at 350° F. or 400° F. (see specific examples below) for four and one half minutes.

Resultant boards were tested for Internal Bond Strength and Thickness Swell in accordance with ASTM method D1037, entitled: Evaluating Properties of Wood-Base Fiber and Particle Panel Materials.

TABLE 1

Comparison of Urea and Melamine Extended Polyisocyanate Binders

| Ex. | Binder Description | Press Temp (° F.) | Density (pcf) | Internal Bond Strength (psi) | % Thickness Swell | % Water Absorption |
|---|---|---|---|---|---|---|
| 1 | 7:1 Sucrose: Isocyanate A (U.S. Pat. No. 4,944,823) | 350 | 40 | 12 | na[1,2] | na[1,2] |
| 2 | 7:1 Urea: Isocyanate A | 350 | 44 | 56 | 46.1 | 96 |
| 3 | 7:1 Melamine: Isocyanate A | 350 | 46 | 56 | 42.7 | 104 |
| 4 | 7:1 Urea: Isocyanate A | 350 | 50 | 110 | 43.2 | na[2] |
| 5 | 7:1 Urea: Isocyanate A | 400 | 52 | 108 | 46 | na[2] |
| 6 | 6:2 Urea: Isocyanate A | 400 | 52 | 210 | 51.5 | na[2] |
| 7 | 3:1 Urea: Isocyanate A | 400 | 52 | 46 | 71 | na[2] |
| 8 | Isocyanate A, 5% resin | 350 | 53 | 279 | 8 | 12 |

Notes:
[1]Sucrose sample fell apart after required exposure to water for water absorption analysis
[2]No analysis was performed for this property A comparison of Examples 2 and 3 (which are representative of the present invention) with Comparative Example 1 illustrates the advantage of using urea or melamine over that of the carbohydrates used in the closest prior art (see U.S. Pat. No. 4,944,823). It is difficult to make comparisons where the same press temperature and/or board density are not used. Examples 2 and 4 can be directly compared with each other as these have the same binder formulation and the same press temperature, but different densities. Examples 4 and 5 can be directly compared with each other as these have the same binder formulation and similar densities, but different press temperatures. Example 5 is included to show that the resin completes cure even at the lower temperature range, and Example 4 is included to allow one to take into account the effect of higher board density. Comparison of Example 2 to Example 7 shows the effect that adding more urea has on the binder efficiency. Example 6 shows that addition of more isocyanate than used in Example 2 allows one to approach the property level of the much more expensive binder using a higher amount of isocyanate without extender as illustrated in Comparative Example 8.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of wood composite materials comprising
a) combining wood particles with 1 to 25% by weight, based on the total weight of the wood composite, of a mixture comprising:
 (1) a solid, dry compound selected from the group consisting of urea, melamine, and mixtures thereof, and
 (2) a polymethylene poly(phenyl isocyanate) having a functionality of about 2.1 to about 3.5, an NCO group content of from about 30 to 33%, and a monomer content of from about 30 to about 90% by weight, wherein the content of the monomer comprise up to about 5% by weight of the 2,2'-isomer, from about 1 to about 20% by weight of the 2,4'-isomer and from about 25% to about 65% by weight of the 4,4'-isomer, based on the entire weight of the polyisocyanate;
 wherein the weight ratio of component a)(1) to component a)(2) is from 10:1 to 2:1, and
b) molding or compressing the coated combination formed in a).

2. The process of claim 1, wherein the wood particles are combined with 2 to 10% by weight, based on the total weight of the wood composite, of a mixture comprising:
 (1) a solid, dry compound selected from the group consisting of urea, melamine, and mixtures thereof, and
 (2) a polymethylene poly(phenyl isocyanate) having a functionality of about 2.1 to about 3.5, an NCO group content of from about 30 to 33%, and a monomer content of from about 30 to about 90% by weight, wherein the content of the monomer comprise up to about 5% by weight of the 2,2'-isomer, from about 1 to about 20% by weight of the 2,4'-isomer and from about 25% to about 65% by weight of the 4,4'-isomer, based on the entire weight of the polyisocyanate;
 wherein the weight ratio of component a)(1) to component a)(2) is from 10:1 to 2:1.

3. The process of claim 1, wherein the wood particles are combined with 3 to 8% by weight, based on the total weight of the wood composite, of a mixture comprising:
 (1) a solid, dry compound selected from the group consisting of urea, melamine, and mixtures thereof, and
 (2) a polymethylene poly(phenyl isocyanate) having a functionality of about 2.1 to about 3.5, an NCO group content of from about 30 to 33%, and a monomer content of from about 30 to about 90% by weight, wherein the content of the monomer comprise up to about 5% by weight of the 2,2'-isomer, from about 1 to about 20% by weight of the 2,4'-isomer and from about 25% to about 65% by weight of the 4,4'-isomer, based on the entire weight of the polyisocyanate;
 wherein the weight ratio of component a)(1) to component a)(2) is from 3:1 to 7:1.

4. The process of claim 1, wherein (2) said polymethylene poly(phenyl isocyanate) has a functionality of from 2.2 to 2.4, an NCO group content of from about 31.2 to about 32.8% by weight, and a monomer content of from about 55% to about 80%, wherein the monomer content comprises no more than about 3% by weight of the 2,2'-isomer, from about 15 to about 20% by weight of the 2,4'-isomer and from about 40 to about 55% by weight of the 4,4'-isomer, based on the entire weight of the polyisocyanate.

5. The process of claim 1, wherein (2) said polymethylene poly(phenyl isocyanate) has an average functionality of from about 2.5 to 3.0, an NCO group content of from about 30 to 32% and a monomer content of from about 40 to 50% by weight, wherein the monomer content comprises no more than about 1 % by weight of the 2,2'-isomer, from about 2 to about 10% by weight of the 2,4'-isomer, and from about 35 to about 45% by weight of the 4,4'-isomer, based on the entire weight of the polyisocyanate.

6. A process for the production of wood composite materials comprising:
a) combining wood particles with (1) a solid, dry compound selected from the group consisting of urea, melamine and mixtures thereof,
b) coating the combination formed in a) with (2) a polymethylene poly(phenyl isocyanate having a functionality of about 2.1 to about 3.5, an NCO group content of from about 30 to 33%, and a monomer content of from about 30 to 90% by weight, wherein the content of the monomer comprises up to about 5% by weight of the 2,2'-isomer, from about 1 to 20% by weight of the 2,4'-isomer and from about 25 to about 65% by weight of the 4,4'-isomer, based on the entire weight of the polyisocyanate, and c) molding or compressing the coated combination formed in b), wherein components (1) and (2) are present in amounts such that there is from 1 to 25% by weight, based on the total weight of the wood composite, of components (1) and (2), and the weight ratio of component (1) to component (2) is from 10:1 to 2:1.

7. The process of claim 6, wherein components (1) and (2) are present in amounts such that there is from 2 to 10% by weight, based on the total weight of the wood composite, of components (1) and (2).

8. The process of claim 6, wherein components (1) and (2) are present in amounts such that there is from 3 to 8% by weight, based on the total weight of the wood composite, of components (1) and (2), and the weight ratio of component (1) to component (2) is from 7:1 to 3:1.

9. The process of claim 6, wherein (2) said polymethylene poly(phenyl isocyanate) has a functionality of from 2.2 to 2.4, an NCO group content of from about 31.2 to about 32.8% by weight, and a monomer content of from about 55% to about 80%, wherein the monomer content comprises no more than about 3% by weight of the 2,2'-isomer, from about 15 to about 20% by weight of the 2,4'-isomer and from about 40 to about 55% by weight of the 4,4'-isomer, based on the entire weight of the polyisocyanate.

10. The process of claim 6, wherein (2) said polymethylene poly(phenyl isocyanate) has an average functionality of from about 2.5 to 3.0, an NCO group content of from about 30 to 32% and a monomer content of from about 40 to 50% by weight, wherein the monomer content comprises no more than about 1 % by weight of the 2,2'-isomer, from about 2 to about 10% by weight of the 2,4'-isomer, and from about 35 to about 45% by weight of the 4,4'-isomer, based on the entire weight of the polyisocyanate.

11. A process for the production of wood composite materials comprising:

a) combining wood particles with (2) a polymethylene poly(phenyl isocyanate) having a functionality of about 2.1 to about 3.5, an NCO group content of from about 30 to 33%, and a monomer content of from about 30 to 90% by weight, wherein the content of the monomer comprises up to about 5% by weight of the 2,2'-isomer, from about 1 to about 20% by weight of the 2,4'-isomer and from about 25 to about 65% by weight of the 4,4'-isomer, based on the entire weight of the polyisocyanate;

b) coating the combination formed in a) with (1) a solid, dry compound selected from the group consisting of urea, melamine and mixtures thereof; and c) molding or compressing the coated combination formed in b);

wherein components (1) and (2) are present in amounts such that there is from 1 to 25% by weight, based on the total weight of the wood composite, of components (1) and (2), and the weight ratio of component (1) to component (2) is from 10:1 to 2:1.

12. The process of claim 11, wherein components (1) and (2) are present in amounts such that there is from 2 to 10% by weight, based on the total weight of the wood composite, of components (1) and (2).

13. The process of claim 11, wherein components (1) and (2) are present in amounts such that there is from 3 to 8% by weight, based on the total weight of the wood composite, of components (1) and (2), and the weight ratio of component (1) to component (2) is from 7:1 to 3:1.

14. The process of claim 11, wherein (2) said polymethylene poly(phenyl isocyanate) has a functionality of from 2.2 to 2.4, an NCO group content of from about 31.2 to about 32.8% by weight, and a monomer content of from about 55% to about 80%, wherein the monomer content comprises no more than about 3% by weight of the 2,2'-isomer, from about 15 to about 20% by weight of the 2,4'-isomer and from about 40 to about 55% by weight of the 4,4'-isomer, based on the entire weight of the polyisocyanate.

15. The process of claim 11, wherein (2) said polymethylene poly(phenyl isocyanate) has an average functionality of from about 2.5 to 3.0, an NCO group content of from about 30 to 32% and a monomer content of from about 40 to 50% by weight, wherein the monomer content comprises no more than about 1 % by weight of the 2,2'-isomer, from about 2 to about 10% by weight of the 2,4'-isomer, and from about 35 to about 45% by weight of the 4,4'-isomer, based on the entire weight of the polyisocyanate.

* * * * *